United States Patent
Miyata et al.

(10) Patent No.: US 9,962,871 B2
(45) Date of Patent: May 8, 2018

(54) INSERT MOLDING METHOD AND INSERT MOLDED ARTICLE

(71) Applicant: SHINSEI KAGAKU KOGYO CO., LTD., Shiga (JP)

(72) Inventors: Yoichi Miyata, Shiga (JP); Ryosuke Tanaka, Shiga (JP); Naoto Kubo, Shiga (JP)

(73) Assignee: SHINSEI KAGAKU KOGYO CO., LTD., Shiga (JP)

( * ) Notice: Subject to any disclaimer, the term of this patent is extended or adjusted under 35 U.S.C. 154(b) by 275 days.

(21) Appl. No.: 14/915,150

(22) PCT Filed: Mar. 28, 2014

(86) PCT No.: PCT/JP2014/059284
§ 371 (c)(1),
(2) Date: Feb. 26, 2016

(87) PCT Pub. No.: WO2015/029482
PCT Pub. Date: Mar. 5, 2015

(65) Prior Publication Data
US 2016/0207233 A1    Jul. 21, 2016

(30) Foreign Application Priority Data
Aug. 30, 2013   (JP) ................. 2013-179766

(51) Int. Cl.
*B29C 45/14* (2006.01)
*B29K 705/10* (2006.01)
*B29K 81/00* (2006.01)

(52) U.S. Cl.
CPC .... *B29C 45/14311* (2013.01); *B29K 2081/00* (2013.01); *B29K 2081/04* (2013.01);
(Continued)

(58) Field of Classification Search
None
See application file for complete search history.

(56) References Cited

U.S. PATENT DOCUMENTS

| 4,980,109 A | 12/1990 | Yamamoto et al. |
| 5,492,963 A | 2/1996 | Ozawa et al. |
| 8,394,503 B2 | 3/2013 | Kuroyama et al. |

FOREIGN PATENT DOCUMENTS

| JP | H01-295810 A | 11/1989 |
| JP | H06-91694 A | 4/1994 |

(Continued)

OTHER PUBLICATIONS

International Search Report issued in Application No. PCT/JP2014/059284, dated Jul. 1, 2014 and translation thereof (5 pages).

*Primary Examiner* — Edmund Lee
(74) *Attorney, Agent, or Firm* — Nakanishi IP Associates, LLC

(57) ABSTRACT

An insert molding method includes: integrally molding a thermoplastic resin with an insert component, by setting the insert component, which is a metal conductor, in a mold; clamping the mold; and injection-filling the thermoplastic resin in a cavity. The insert component is made of copper or a copper alloy. Prior to injection molding, a thin film layer mainly made of a chlorosulfonated polyethylene is formed on a surface of a portion of the insert component to be covered with the thermoplastic resin, and the thin film layer is crosslinked in the mold during injection molding.

4 Claims, 2 Drawing Sheets

(52) U.S. Cl.
CPC .. *B29K 2705/10* (2013.01); *B29K 2995/0005* (2013.01); *B29K 2995/0007* (2013.01)

(56) References Cited

FOREIGN PATENT DOCUMENTS

| | | |
|---|---|---|
| JP | 2927369 B2 | 7/1999 |
| JP | 2006-027249 | 2/2006 |
| JP | 2010-030177 A | 2/2010 |
| JP | 2010-111799 A | 5/2010 |
| WO | 2009/078382 A1 | 6/2009 |

INSERT MOLDING METHOD AND INSERT MOLDED ARTICLE

TECHNICAL FIELD

The present invention relates to an insert molding method and an insert molded article, which give excellent adhesion between a metal and a resin.

BACKGROUND ART

Many of electrical components equipped in automobiles are composed of combinations of metal conductors and resin insulators. Within these electrical components, a large current on the order of 1 to 100 A flows to metal conductors. In order to prevent the metal conductors, to which a large current flows, from malfunctioning due to moisture, it is required to surely carry out waterproofing treatment on the metal conductors by the resin insulators.

In particular, when moisture infiltrates into the inner parts of the electrical components, some parts built in the electrical components may go out of order, and therefore, electrical components are required to be surely provided with waterproofing mechanisms.

An electrical component is usually manufactured by an insert molding method in order to enhance adhesion between a metal conductor and a resin insulator. However, in an insert molded article formed of the resin insulator and the metal conductor, a metal having a small linear expansion coefficient contacts a resin or a resin composition having a large mold shrinkage factor or a large linear expansion coefficient, and therefore, a large thermal stress is generated between the metal conductor and the resin insulator during injection molding and cooling. Such a large thermal stress may easily cause the occurrence of peeling off at an interface between the metal conductor and the resin insulator, which may cause a problem of deterioration of adhesion at the interface between the metal conductor and the resin insulator. In particular, since the resin insulator contracts significantly during a cooling process after molding, the deterioration of adhesion may easily occur at the interface between the metal conductor and the resin insulator. As a result, a gap may be generated between the metal conductor and the resin insulator, and water may infiltrate from the gap.

Accordingly, it has been considered that the waterproof construction of the electrical component should have a structure through which no moisture can pass even when some moisture enters into the gap between the resin insulator and the metal conductor. For example, by making the structure of the resin insulator have a sufficiently large thickness, it is possible to prevent moisture from infiltrating into the inner parts of the electrical component even if a gap is generated at the interface between the resin insulator and the metal conductor, because the length of the resin insulator from the outside surface to the inside surface at the interface can be lengthened. With regard to parts which particularly require high waterproofing properties, sufficient waterproofing properties can be realized by using a sealing member such as a packing and an O-ring.

By the way, in recent years, in response to a request for miniaturization and weight reduction of an electrical component for the purpose of improving the fuel consumption and the like of an automobile, insert molding which enables the miniaturization has been conducted. As a resin insulator for the miniaturization and weight reduction, engineering plastics which exhibit excellent electrical properties and good heat resistance have been used. As engineering plastics, for example, a polyphenylene sulfide resin, a polybutylene terephthalate resin, a nylon-based resin, a modified polyphenylene ether-based resin and the like have been used.

In particular, in recent years, the polyphenylene sulfide resin, which exhibits a low water absorption property, good dimensional stability and high fluidity, and therefore can realize thin-wall molding, has been increasingly used in electrical components of automobiles.

However, in thin-wall insert molding in which the polyphenylene sulfide resin is used, moisture may infiltrate into the inner parts of the electrical component from a very small gap at the interface between the resin insulator and the metal conductor because the thickness of the resin insulator is small. When water infiltrates from the very small gap at the interface, there are concerns about bad influences on the electronic control, and therefore, an issue of adhesion between the resin and the metal has attracted attention.

CITATION LIST

Patent Literatures

Patent Literature 1: JP 2010-030177 A
Patent Literature 2: WO 2009/078382 A

SUMMARY OF THE INVENTION

Technical Problems

In order to solve the above problems, for example, JP 2010-030177 A (Patent Literature 1) discloses an invention which improves adhesion between a resin insulator and a metal conductor by blending a polyolefin resin into a polyphenylene sulfide resin.

However, when a polyolefin resin having a melting point lower than that of a polyphenylene sulfide resin by 100° C. or more, the polyphenylene sulfide resin having a high molding temperature, is added to the polyphenylene sulfide resin, a problem of contaminants generated due to carbonization/degradation of the added polyolefin resin may occur. In addition, there may be another problem of contamination of a mold due to low molecular weight substances generated from the polyolefin resin by the thermal decomposition. Further, an effect of high adhesion may not be sufficiently exhibited depending on the shape and molding conditions.

As described above, when a polyolefin resin is added to a polyphenylene sulfide resin, there are a lot of problems, and therefore, a novel technique of adhesion has been desired.

In response to this, a new technique of adhesion between a metal insert component and a resin is disclosed, for example, in WO 2009/078382 A (Patent Literature 2).

On the surface of the metal insert component disclosed in Patent Literature 2, a layer of copper oxides is formed. The layer of copper oxides is formed by using a copper oxide which contains copper (I) oxide ($Cu_2O$) and copper (II) oxide ($CuO$) such that a ratio of copper (I) oxide ($Cu_2O$) contained in the copper oxide is within a predetermined range.

In addition, Patent Literature 2 discloses that a strong adhesive effect is exhibited between the copper-based metal insert component and engineering plastics such as a polyphenylene sulfide resin and a polybutylene terephthalate resin by forming the layer of copper oxides on the surface of the metal insert component.

However, the invention disclosed in Patent Literature 2 has problems in terms of mass production, because a process from the surface treatment on the insert component to molding has to be carefully controlled.

The present invention has been completed in view of the above-described circumstances, and an object of the present invention is to provide an electrical component to be mainly equipped in an automobile (an electrical component for automobile use) which exhibits a waterproof effect with high reliability by achieving sufficient adhesion between a metal conductor and a resin in a mold when insert molding using the metal conductor is conducted.

Solution to Problems

The insert molding method according to the present invention is an insert molding method for integrally molding a thermoplastic resin with an insert component, by setting the insert component, which is a metal conductor, in a mold; clamping the mold; and injection-filling the thermoplastic resin in a cavity, wherein the insert component is made of copper or a copper alloy, and prior to injection molding, a thin film layer mainly made of a chlorosulfonated polyethylene is formed on a surface of a portion of the insert component to be covered with the thermoplastic resin, and the thin film layer is crosslinked in the mold during injection molding.

In view of the above-described problems, the present inventors have found that waterproof properties can be retained by subjecting an insert component having a thin film layer which is mainly made of a chlorosulfonated polyethylene (hereinafter, referred to as a CSM) and is in a non-crosslinked state to insert molding such that adhesion between a resin insulator and the insert component, which is a metal conductor, can be achieved through the thin film layer crosslinked by heat generated during injection molding.

The thin film layer is formed by preparing an organic solution, which is obtained by adding an auxiliary agent such as a crosslinking agent to a CSM and dispersing them in an organic solvent; applying the organic solution to the insert component; and drying the same.

Then, the insert component having the thin film layer is subjected to insert molding such that the CSM in the thin film layer is crosslinked in a mold by heat generated during injection molding, and waterproof properties can be retained by adhesion obtained between the resin insulator and the insert component through the thin film layer.

As described above, according to the insert molding method of the present invention, prior to injection molding, a thin film layer mainly made of a CSM is formed on a surface of a portion of an insert component made of copper or a copper alloy to be covered with a thermoplastic resin, and then the insert component on which the thin film layer is formed is placed in a mold and the thermoplastic resin is injected in the mold. Accordingly, the thin film layer is heated and crosslinked by the high temperature resin in the mold or the high temperature mold during injection molding, and therefore, good adhesion between the insert component and the thermoplastic resin is achieved through the thin film layer.

As a result, even when the thermoplastic resin thermally contracts after injection molding, the thin film layer, by its own elastic force, absorbs the contraction of the thermoplastic resin, and therefore, the adhesion between the insert component and the thermoplastic resin is maintained.

In addition, no gap is formed between the metal conductor, which is the insert component, and the resin insulator made of the thermoplastic resin, and therefore, an electrical component which can exhibit a good water-proof function is obtained.

Further, the present inventors have found that even when an insert component, which is a metal conductor, having a thin film layer made mainly of a CSM on a surface thereof, is subjected to insert molding after being stored for a long period of time under a room temperature environment, the insert component exhibits high adhesion. Based on this finding, it was found that the insert component obtained by the insert molding method according to the present invention is suitable for mass production.

In the insert molding method according to the present invention, it is preferable that the thermoplastic resin is a polyphenylene sulfide resin (hereinafter referred to as a PPS resin). A PPS resin has an excellent thermal deformation temperature of 260° C. or more and an excellent actual value of a continuous use temperature of 170° C. or more, and is also excellent in chemical resistance and insulation properties. In addition, a PPS resin has good fluidity and excellent dimensional stability, and therefore, is suitable for precise injection molding. As a result, an electrical component well suited for automobile use can be obtained by conducting molding by using a PPS resin for a resin insulator.

In addition, the insert molded article according to the present invention is an insert molded article formed by using the insert molding method, wherein a portion of the metal conductor made of copper or the copper alloy is integrally connected with a resin insulator made of a thermoplastic resin through the thin film layer mainly made of the chlorosulfonated polyethylene.

In the insert molded article according to the present invention, a thin film layer mainly made of a chlorosulfonated polyethylene is formed between a metal conductor and a resin insulator such that the thin film layer absorbs the contraction of the resin insulator, and therefore, good adhesion between the resin insulator and the metal conductor can be achieved.

As a result, no gap is formed between the metal conductor and the resin insulator in the insert molded article according to the present invention, which gives a good water-proof function.

Advantageous Effects of Invention

As described above, according to the insert molding method of the present invention, good adhesion between the insert component, which is the metal conductor, and the thermoplastic resin can be achieved through the thin film layer by crosslinking the thin film layer in the mold during injection molding. In other words, according to the insert molding method of the present invention, even when the thermoplastic resin thermally contracts, the thin film layer, by its own elastic force, absorbs the strain of the thermoplastic resin, and therefore, the adhesion between the metal conductor and the resin insulator is maintained.

As a result, according to the insert molding method of the present invention, an electrical component which exhibits a good water-proof function can be manufactured without forming any gap between the metal conductor and the resin insulator made of the thermoplastic resin even when the resin insulator thermally contracts.

In addition, with the insert molded article of the present invention, the thin film layer formed by the insert molding method according to the present invention absorbs the difference in expansion and contraction between the metal conductor and the resin insulator such that the good adhesion between the resin insulator and the metal conductor is achieved, and therefore, no gap is formed between the metal conductor and the resin insulator, and an electrical component having a good water-proof function can be obtained.

DESCRIPTION OF EMBODIMENTS

An embodiment of an insert molded article having high adhesion manufactured by the insert molding method according to the present invention is described hereinafter with reference to the attached drawings.

Figure 1:
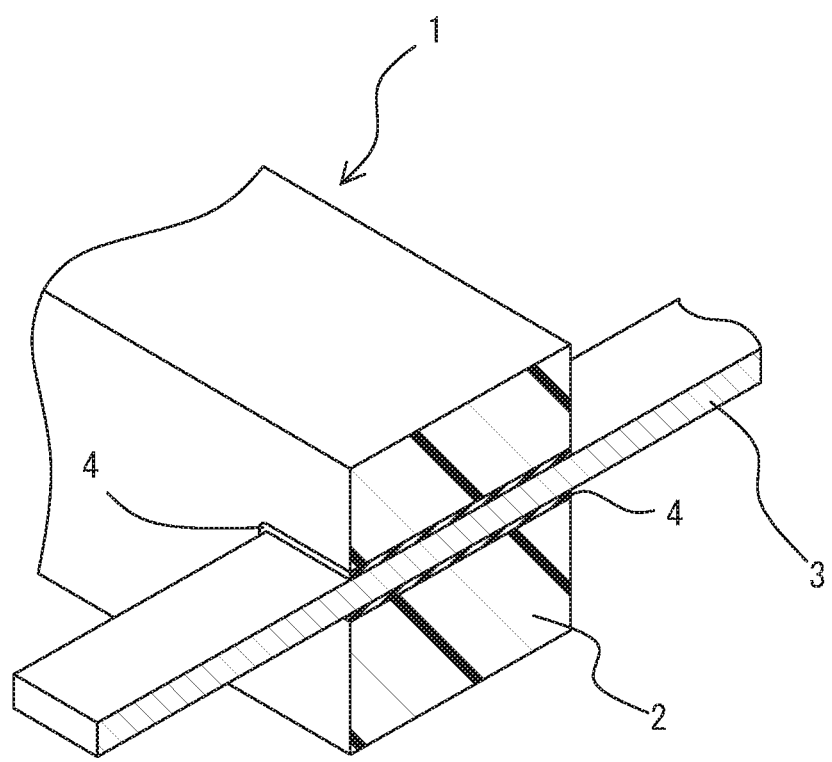
FIG. 1 shows an embodiment of the present invention, and is a partial cross-sectional perspective view which shows surroundings of joints between a metal conductor and a resin insulator of an insert molded article obtained by the insert molding method according to the present invention.

As shown in FIG. 1, in the insert molded article, a portion of a metal conductor 3 is covered with a resin insulator 2, and a thin film layer 4 is formed on a surface of a portion of the metal conductor 3 to be covered with the resin insulator 2. Accordingly, the thin film layer 4 is not formed on portions of the metal conductor 3 which constitute the termini because the termini are made to be exposed to the outside.

Meanwhile, an end part of the thin film layer 4 may be protruded from the resin insulator 2, or may be placed more inward than the resin insulator 2 such that the end part is covered with the resin insulator 2. In either case, good adhesion between the metal conductor 3 and the resin insulator 2 is achieved through the thin film layer 4.

An insert molded article 1 having the resin insulator 2 and the metal conductor 3 is formed by an insert molding method, which is a generally adopted injection molding method using a stationary side mold and a movable side mold, although not shown in the drawing.

When insert molding is conducted, first, the stationary side mold and the movable side mold are clamped such that portions of the metal conductor 3 to be protruded from the resin insulator 2 are held by the stationary side mold and the movable side mold. At least a portion of the metal conductor 3 on which the thin film layer 4 is formed is put into a state where the portion is located in a cavity formed by each of the molds.

Thereafter, molding is conducted by injecting a molten resin into the cavity. When the molten resin is injected, a crosslinking (vulcanization) reaction of the thin film layer 4 on the metal conductor 3 starts by utilizing heat conducted from the stationary side mold and the movable side mold, both of which are heated in order to improve fluidity of the molten resin, and heat of the molten resin.

By this effect of crosslinking, an insert molded article can be obtained, in which the metal conductor 3 is adhered to the resin insulator 2 through the thin film layer 4.

Meanwhile, when at least a portion of the metal conductor 3, having the thin film layer 4 thereon, is placed in the cavity, it is preferable that both end parts of the thin film layer 4 are put into a state where the parts are brought into contact with the inner surface of the mold in the cavity.

In addition, an end part of the thin film layer 4 may be held by the stationary side mold and the movable side mold, or may be placed more inward than the inner surface of the mold in the cavity. When injection molding is conducted in a state where an end part of the thin film layer 4 is held by the stationary side mold and the movable side mold, the thin film layer 4 is put into a state where the end part is protruded from the resin insulator 2, as described above. On the other hand, when injection molding is conducted in a state where an end part of the thin film layer 4 is placed more inward than the inner surface of the mold in the cavity, the end part of the thin film layer 4 is put into a state where the end part is covered with the resin insulator 2, instead of being exposed to the outside, as described above.

As shown in FIG. 1, the metal conductor 3 is molded by press molding or the like such that a long plate material made of copper or a copper alloy takes a shape matched with the purpose of use. Then, a portion of the metal conductor 3 is embedded in the resin insulator 2, and the other portions of the metal conductor 3 are exposed to the outside. Specific examples of the metal used for the metal conductor 3 include copper, brass, and phosphor bronze. In addition, as the metal conductor 3, that which is tin-plated is often used, but that which is nickel-plated, gold-plated or silver-plated may be used according to the purpose of use.

Then, as shown in FIG. 1, the thin film layer 4 mainly made of a chlorosulfonated polyethylene (a CSM) is formed on a surface of a portion of the metal conductor 3 to be covered with the resin insulator 2. The thin film layer 4 is formed in order to enhance adhesion between the resin insulator 2 and the metal conductor 3, and is formed beforehand prior to injection molding. Accordingly, the thin film layer 4 is formed at least on the surface of the portion of the metal conductor 3 to be covered with the resin insulator 2, and is not formed on the surfaces of the other portions.

The thin film layer 4 is formed from a mixture of a CSM, a crosslinking agent (a vulcanizing agent), a crosslinking promoter (a vulcanization promoter) and the like (hereinafter the mixture is referred to as a rubber composition). In order for the CSM to exhibit its own performance effectively, an antioxidant, an antiaging agent, a filler, a processing aid, a softener, a wettability improving agent for improving wettability against the resin/the metal conductor and the like are added as needed. When the rubber composition is prepared, a CSM, a crosslinking agent (a vulcanizing agent), a crosslinking promoter (a vulcanization promoter), an acid acceptor, an antioxidant and the like are added into an organic solvent and stirred until the mixture becomes homogeneous. In this way, an organic solution of the rubber composition is prepared. The organic solution of the rubber composition is applied to the prescribed portion of the metal conductor 3 and is dried to form the thin film layer 4.

The CSM used in this embodiment is obtained by reacting a polyethylene, an ethylene-butene-1 copolymer, an ethylene-vinyl acetate copolymer, an ethylene-propylene copolymer, an ethylene-ethyl acrylate copolymer, an ethylene-methyl acrylate copolymer or the like with chlorine and a sulfurous acid gas such that chlorination and chlorosulfonation occur to make the CSM rubber-like.

Examples of the crosslinking agent which may be used in this embodiment include magnesium oxide, a maleimide compound such as N,N'-m-phenylenedimaleimide, and an organic oxide such as dicumyl peroxide.

Examples of the crosslinking promoter which may be used in this embodiment include thiuram compounds such as dipentamethylene thiuram tetrasulfide, tetramethylthiuram disulfide, and tetraethylthiuram disulfide, 6-ethoxy-1,2-dihydro-2,2,4-trimethylquinoline, dibutyldithiocarbamic acid, and 2-mercaptobenzimidazole.

Examples of the acid acceptor which may be used in this embodiment include metal oxides and metal hydroxides such as magnesium oxide, calcium oxide, calcium hydroxide, and magnesium hydroxide, and hydrotalcite.

As a solvent for dissolving a rubber composition, an inert organic solvent which dissolves a CSM is used. Specifically, for example, toluene, xylene, methylene chloride, carbon tetrachloride, trichloroethylene, and methyl ethyl ketone may be used. Among them, methyl ethyl ketone and toluene are preferable because they are relatively easily available and highly safe. Methyl ethyl ketone is particularly preferable because drying time after being applied to the metal conductor is shortened due to its high volatility.

Here, a solid substance of the rubber composition is prepared by kneading a CSM and additives beforehand by means of a roll type kneading machine, a kneader, a Banbury mixer or the like until the additives are uniformly mixed, in order that a CSM, a crosslinking agent (a vulcanizing agent), a crosslinking promoter (a vulcanization promoter), an acid acceptor and an antioxidant are more homogeneously mixed. By dissolving this solid substance of the rubber composition in an organic solvent, a more homogeneous organic solution can be prepared.

By forming the thin film layer 4 by using the homogeneous organic solution of the CSM rubber composition, an insert molded article with better adhesion can be obtained when insert molding is conducted.

A method for applying the organic solution is not limited as long as the method is capable of applying the organic solution to the portion of the metal on which the resin is placed. For example, an application method using a coating method such as a brush coating method, an airbrushing method and a dipping method or a printing method such as a pad printing method, a silk printing method and an ink-jet printing method can be employed.

In addition, it is desirable to secure the intended thickness by a single application, but when uniform thickness or large thickness is required, multiple applications can be employed.

When the thin film layer 4 is formed by coating, the thin film layer 4 can be formed precisely only on the required portion of the metal conductor 3 by conducting coating with masking the portion of the metal conductor 3 on which the thin film layer 4 is not to be formed.

In this embodiment, when the rubber composition is dissolved in the organic solvent, the concentration of the organic solution is selected such that the amount of the CSM rubber composition is in the range of 10 parts by weight or more and 70 parts by weight or less, based on 100 parts by weight of the organic solvent, depending on the organic solvent used, the application method to the metal conductor and the intended thickness of the thin film layer 4.

When the concentration of the rubber composition in the organic solution is too low, the effect of the thin film layer 4 tends to be low, and as a result, the adhesive effect tends to be low. On the other hand, when the concentration of the rubber composition in the organic solution is too high, the organic solution tends not to be applied uniformly, and as a result, the thickness of the thin film layer 4 tends to be non-uniform.

Accordingly, when the organic solution is applied by a coating method such as a spraying method, the concentration of the rubber composition in the organic solution is adjusted such that the amount of the CSM rubber composition is 30 parts by weight or more and 70 parts by weight or less, based on 100 parts by weight of the organic solvent. In addition, when the organic solution is applied by a printing method, the concentration of the rubber composition in the organic solution is adjusted such that the amount of the CSM rubber composition is in the range of 10 parts by weight or more and 50 parts by weight or less, based on 100 parts by weight of the organic solvent.

As a method for drying the organic solution according to this embodiment, a drying method such as natural drying, heat drying and vacuum drying is employed, and a drying time is not limited as long as the organic solvent evaporates.

However, heat drying is preferably selected as long as heat drying is conducted under drying conditions which do not cause crosslinking of the CSM rubber composition, because heat drying can shorten the drying time. When heat drying is performed, a drying temperature is preferably 70° C. or lower. In addition, long time storage after drying is possible when the organic solution is dried under a temperature environment of room temperature or lower.

The thickness of the thin film layer 4 varies depending on a method for inserting a portion of the metal conductor 3 into the thermoplastic resin, an operating temperature and a size of an insert molded article used, a difference in linear expansion coefficient between the resin insulator 2 and the metal conductor 3, and the like.

In this embodiment, the thin film layer 4 having a thickness in the range of 5 µm or more and 100 µm or less is formed. When the thickness of the thin film layer 4 is too small, an adhesive effect due to the thin film layer 4 tends to be small, and therefore, the thin film layer 4 tends to be low in waterproof properties. On the other hand, when the thickness of the thin film layer 4 is too large, the thin film layer 4 tends to be swept away in the insert molding step, and the thin film layer 4 which has been swept away tends to be contaminants for an electrical component, or tends to pollute the mold.

Accordingly, the thickness of the thin film layer 4 is preferably 10 µm or more and 60 µm or less, and is more preferably 10 µm or more and 40 µm or less. A thickness in this range is stable as well as makes it possible to exhibit the effect which is the purpose of the present invention.

As a thermoplastic resin used for injection molding to mold the resin insulator 2, engineering plastics which are good in heat resistance, chemical resistance, weather resistance and electrical properties can be employed. Among the engineering plastics, a polyphenylene sulfide resin, a polybutylene terephthalate resin, a nylon-based resin and a modified polyphenylene ether resin are preferable. These resins are preferable because they are good in heat resistance, chemical resistance, weather resistance and electrical properties, and are used for an electrical component for automobile use such as various types of busbar molded articles and junction boxes which are used in automobiles.

Among the above-described engineering plastics, a polyphenylene sulfide resin is particularly preferable because the polyphenylene sulfide resin exhibits excellent dimensional properties, a low water absorption property and thin-wall moldability in addition to the above-described properties, and therefore, the polyphenylene sulfide resin has high adaptability to an electrical component suited to the needs of the user. Further, the crosslinking reaction of the polyphenylene sulfide resin can be surely performed, and therefore, high adhesion can be achieved with high reliability, because the resin has a high temperature of about 300° C. and a mold has a high temperature of about 150° C. when insert molding is conducted using the polyphenylene sulfide resin.

When injection molding of the resin insulator 2 is conducted, it is preferable that a glass filler (hereinafter referred to as GF), an inorganic reinforcing material, an additive which gives toughness, and the like are added, in an amount required for the performance of an electrical component, to the thermoplastic resin in order to enhance strength.

Further, a molding aid such as a crystal nucleating agent, a mold release agent, and an antioxidant may appropriately be added.

Then, a method for manufacturing the insert molded article 1 shown in FIG. 1 according to this embodiment is specifically described.

First, the thin film layer 4 of the CSM rubber composition is formed on the portion on the surface of the metal conductor 3, which is a molded article molded by a metal pressing method, to be covered with the resin insulator 2, by using the above-described method.

Next, although not shown in the drawing, the metal conductor 3 on which the thin film layer 4 has been formed is housed within a stationary side mold and a movable side mold. Specifically, portions of the metal conductor 3, not having the resin insulator 2 thereon, such as both the end parts of the metal conductor 3 are fitted into a fitting recess formed by the movable side mold and/or the stationary side mold. Thereafter, the movable side mold is moved to clamp the mold, such that the portions of the metal conductor 3 which have been fitted into the fitting recess are held by the stationary side mold and the movable side mold. Among the portions of the metal conductor 3, the portion to be covered with the resin insulator 2 including the portion on which the thin film layer 4 has been formed, is put into a state of being positioned in the cavity without contacting each of the molds.

In such a state where the metal conductor 3 is positioned in the cavity, the thermoplastic resin which has been melted by using an injection molding machine, which is not shown in drawings, is injected into the cavity to conduct insert molding. The molten thermoplastic resin is filled into the cavity such that the molten thermoplastic resin covers the thin film layer 4 which has been formed on the surface of the metal conductor 3, and then the resin is solidified to take a predetermined shape within the molds.

The crosslinking (vulcanization) reaction of the thin film layer 4 made of the CSM rubber composition occurs by utilizing heat conducted from the stationary side mold and the movable side mold, both of which are heated to enhance the fluidity of the molten resin, and heat of the molten resin. As a result, an insert molded article can be obtained, in which the metal conductor 3 is adhered to the resin insulator 2 through the thin film layer 4.

With regard to the CSM rubber composition used here to obtain the thin film layer 4, a partially crosslinked CSM rubber composition may be contained in the thin film layer 4 as long as adhesion which meets the purpose of the present invention can be realized.

Then, after the resin insulator 2 is solidified, the molds are opened and the molded article is taken out.

Meanwhile, in this embodiment, insert molding is conducted after 1 day has passed from drying of the organic solution of the CSM rubber composition applied to the metal conductor 3. By the way, the crosslinking reaction of the rubber composition is difficult to occur under a room temperature environment. Accordingly, even when conducting insert molding by using the metal conductor 3 which has been stored under a room temperature environment after the organic solution is applied to the metal conductor 3 and is dried to form the thin film layer 4, and then stored as needed, an adhesive effect equivalent to that described above can be achieved.

In addition, in order to secure fluidity of the resin during insert molding, the metal conductor 3 is sometimes preheated. In such a case, the metal conductor 3 can be preheated in the condition that crosslinking of the rubber composition of the thin film layer 4 does not occur significantly, according to this embodiment.

As described above, the insert molded article 1 according to this embodiment exhibits good adhesion between the engineering plastic resin, which constitutes the resin insulator 2, and the metal conductor 3, by forming the thin film layer 4 on the surface of the metal conductor 3 and crosslinking the thin film layer 4 utilizing heat during injection molding. As a result, good adhesion between the resin insulator 2 and the metal conductor 3 can be achieved through the thin film layer 4, and therefore, the insert molded article 1 which has a secure water-proof function can be obtained.

Meanwhile, the insert molding method according to the present invention is not limited to the embodiment which is illustrated by the above description and drawings, and it is possible to make various modifications within the scope of the present invention. The insert molding method according to the present invention can be applied to an insert molded article which includes parts made of copper or a copper alloy which is electrically conductive as an insert component. The shape and the like of the insert molding article according to the present invention are not particularly limited as long as the molded article is obtained by injection molding of a thermoplastic resin after forming a thin film layer on the surface of a portion of an insert component to be covered with the thermoplastic resin.

The type of the insert molding method according to the present invention may be a type in which only a single insert component is inserted, or may be a type in which an insert component is made in the shape of a continuous strip and is cut after injection molding, that is, so-called hoop molding.

According to the insert molding method of the present invention, good parts can be obtained for an electrical component for automobile use for which particularly good waterproof properties are required, for example, an ECU for automobile use, a junction block, peripheral parts of a motor, a battery terminal and a battery connector for electric automobile use as well as a sensor connector of a pressure sensor, a temperature sensor, an acceleration sensor or the like.

In addition, the insert molding method according to the present invention can also be applied to parts of a home electric appliance for which similar waterproof properties to an electrical component for automobile use are required. For example, the insert molding method according to the present invention can also be applied to peripheral parts of a motor, various types of sensor connectors and the like.

EXAMPLES

Insert molded articles of Examples 1 to 9 shown hereinafter, which were manufactured in similar ways to the above-described embodiment, were compared with those of Comparative Examples 1 and 2.

An organic solution used for the present examples and comparative examples was prepared by a method including preparing a rubber composition by kneading a CSM rubber, a crosslinking agent, a crosslinking promoter, an acid acceptor and an antioxidant beforehand in order to form a more homogeneous thin film layer 4A, and dissolving the rubber composition in an organic solvent. Meanwhile, the method for preparing an organic solution is not limited to the above-described method as long as a rubber composition can be homogeneously dispersed in an organic solvent.
(Preparation of Rubber Composition)

A rubber composition was obtained by adding the following to 100 parts by weight of a chlorosulfonated polyethylene (TOSO-CSM (registered trademark) CM-1500: manufactured by TOSOH CORPORATION):

4 parts by weight of magnesium oxide (Kyowa Mag (registered trademark) 150: manufactured by Kyowa Chemical Industry Co., Ltd.) as a crosslinking agent and an acid acceptor;

2 parts by weight of dipentamethylene thiuram tetrasulfide (Nocceler (registered trademark) TRA: manufactured by OUCHI SHINKO CHEMICAL INDUSTRIAL CO., LTD.) as a crosslinking promoter; and 3 parts by weight of pentaerythritol (Neulizer (registered trademark) P: manufactured by The Nippon Synthetic Chemical Industry Co., Ltd.) as an antioxidant;
and kneading them at a processing temperature of 80° C. for 5 minutes by using a pressurizing kneader (INC-118 Model: manufactured by Imoto Machinery Co., Ltd.).
(Preparation of Organic Solution)

The rubber composition was weighed based on a prescribed concentration. The rubber composition was added into toluene (Wako 1st Grade Toluene: manufactured by Wako Pure Chemical Industries, Ltd.), and the mixture was stirred for 4 hours by using a stirrer to give an organic solution.
(Insert Component)

As insert components 3A used in examples and comparative examples, three types of metal plates, each of which was made of copper, brass or phosphor bronze, were used. As each insert component 3A, a plate member having a rectangle shape of 20 mm×60 mm×1 mm thickness, and having a surface roughness Ra of the surface covered with a resin insulator 2A of 0.15 µm was used.
(Manufacture of Thin Film Layer)

With regard to the insert component 3A, having a thin film layer 4A thereon, the thin film layer 4A was formed by applying the organic solution to a prescribed portion of the insert component 3A by using a bar coater and naturally drying the solution under a room temperature environment of 25° C. for 16 hours.

The thickness of the thin film layer 4A was determined by measuring thicknesses of four corners and a central part of a metal plate having a rectangle shape, subtracting the thickness of the metal plate which had been measured beforehand from the measured thicknesses to calculate the thicknesses, and obtaining an average value of the thicknesses of the five positions, which was considered as the thickness of the thin film layer 4A.
(Molding Material)

As molding materials used in the present examples and comparative examples for forming the resin insulator 2A, those which contained a commercially available polyphenylene sulfide resin, to which different concentrations of reinforcing materials such as GF were added, and were dried in a drying machine at 140° C. for 3 hours or more, were used.
(Insert Molding)

Figure 2:
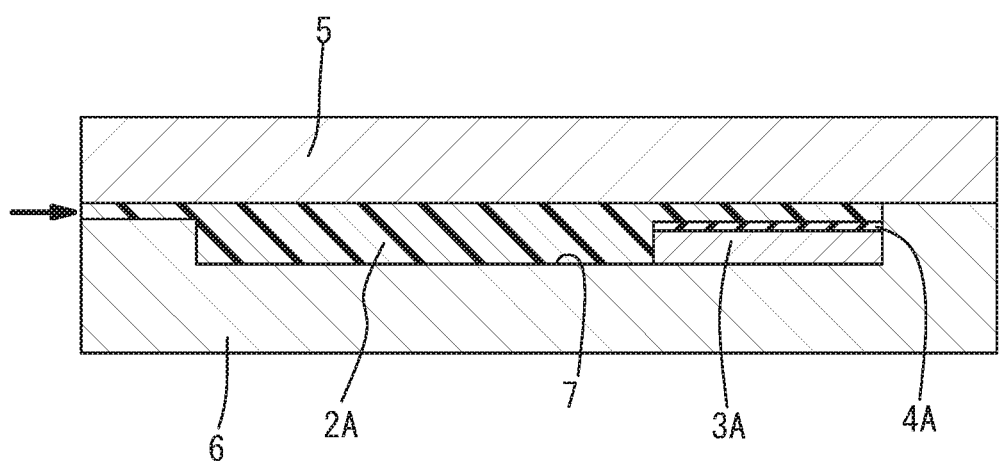
FIG. 2 is a cross-sectional view of a mold for molding an insert molded article for evaluation by means of the insert molding method according to the present invention.

As shown in FIG. 2, a mold (manufactured by NISSEI PLASTIC INDUSTRIAL CO., LTD.) having a stationary side mold 5 and a movable side mold 6 was used to form a cavity 7 having a flat plate shape with a total length of 60 mm×a width of 60 mm×a thickness of 1.7 mm.

As shown in FIG. 2, the insert component 3A (in Comparative Example 1, the thin film layer 4A was not formed) was set in the cavity 7, and insert molding was conducted by using an injection molding machine (LA-100: manufactured by Sodick) with a clamping force of 980 kN and a plunger diameter of 25 mm to give an insert molded article. Two or more insert molded articles 3A were formed in each of Example 1 to Example 9 as well as Comparative Example 1 and Comparative Example 2.

Main molding conditions when insert molding was conducted were: a resin temperature of 320° C., a mold temperature of 130° C., an injecting speed of 30 mm/sec and a holding pressure of 40 MPa.
(Evaluation of Adhesion of Insert Molded Article)

After leaving the obtained insert molded article as it was for 1 day at room temperature, the insert molded article was immersed in a dye penetrant inspection liquid (COLOR CHECK (registered trademark) FP-S: manufactured by TASETO Co., Ltd.) at room temperature for 15 minutes. After the dye penetrant inspection liquid which had been attached to the surface of the molded article was removed, the insert component 3A made of the metal and the resin insulator 2A were separated from each other, and the adhesion between the resin insulator 2A and the insert component 3A was evaluated based on presence or absence of the infiltration of the dye penetrant inspection liquid.
(Evaluation of Adhesion after Heat Cycle Test)

The obtained insert molded article was kept as it was for 1 day at room temperature, and thereafter, a heat cycle test at −35° C. and at 150° C. was conducted.

In the test, a cycle in which an insert molded article was held at −35° C. for 15 minutes and then was held at 150° C. for 15 minutes was repeated 10 times.

After the test, the insert molded article was immersed in a dye penetrant inspection liquid at room temperature for 15 minutes by a method similar to the above-described method for evaluating adhesion, and thereafter, the insert component 3A and the resin insulator 2A were separated from each other to evaluate adhesion.

Example 1

To 100 parts by weight of toluene, 40 parts by weight of the above-described CSM rubber composition was added to prepare an organic solution. The organic solution was applied to a brass plate which has a name of brass and a mark of C2801P prescribed in JIS H3100 (hereinafter referred to as a brass plate C2801P), and the plate was dried to give an insert component on which a thin film layer in a non-crosslinked state was formed.

At this time, the average thickness of the thin film layer was 34 µm.

Insert molding was conducted by using the insert component and a non-reinforced PPS resin (DURAFIDE (registered trademark) 0220A9: manufactured by Polyplastics Co., Ltd.). The insert molding was conducted after the insert component 3A, on which the thin film layer 4A had been formed by natural drying under an environment of room temperature (25° C.) for 16 hours, was further kept as it was at room temperature for 1 day.

According to the evaluation of adhesion of the obtained insert molded article, no infiltration of the dye penetrant inspection liquid into the thin film layer was observed.

In addition, the evaluation of adhesion of the insert molded article after the heat cycle test was conducted, and it was found that there were portions of the thin film layer into which the dye penetrant inspection liquid infiltrated at about 5% of the total, but it was jugged that the adhesion had no problem in practical use.

According to Example 1, it was confirmed that a good adhesive effect is achieved by conducting insert molding by using the insert component, which was the brass plate on which the thin film layer made of the CSM rubber composition was formed, and the non-reinforced PPS resin.

Example 2

To 100 parts by weight of toluene, 40 parts by weight of the above-described CSM rubber composition was added to prepare an organic solution. The organic solution was applied to a brass plate C2801P, and the plate was dried to give an insert component on which a thin film layer in a non-crosslinked state was formed.

At this time, the average thickness of the thin film layer was 30 μm.

Insert molding was conducted by using the insert component and a PPS resin to which 30 parts by weight of GF had been added (DURAFIDE 1130A1: manufactured by Polyplastics Co., Ltd.). The insert molding was conducted after the insert component 3A, on which the thin film layer 4A had been formed by natural drying under an environment of room temperature (25° C.) for 16 hours, was further kept as it was at room temperature for 1 day.

According to the evaluation of adhesion of the obtained insert molded article, no infiltration of the dye penetrant inspection liquid into the thin film layer was observed.

In addition, the evaluation of adhesion of a sample after the heat cycle test was conducted, and no infiltration of the dye penetrant inspection liquid into the thin film layer was observed.

According to Example 2, it was confirmed that a good adhesive effect is achieved by conducting insert molding by using the insert component, which was the brass plate on which the thin film layer made of the CSM rubber composition was formed, and the PPS resin which had been reinforced by addition of 30 parts by weight of GF.

Example 3

To 100 parts by weight of toluene, 40 parts by weight of the above-described CSM rubber composition was added to prepare an organic solution. The organic solution was applied to a brass plate C2801P, and the plate was dried to give an insert component on which a thin film layer in a non-crosslinked state was formed.

At this time, the average thickness of the thin film layer was 35 μm.

Insert molding was conducted by using the insert component and a PPS resin to which 40 parts by weight of GF had been added (DURAFIDE 1140A1: manufactured by Polyplastics Co., Ltd.). The insert molding was conducted after the insert component 3A, on which the thin film layer 4A had been formed by natural drying under an environment of room temperature (25° C.) for 16 hours, was further kept as it was at room temperature for 1 day.

According to the evaluation of adhesion of the obtained insert molded article, no infiltration of the dye penetrant inspection liquid into the thin film layer was observed.

In addition, the evaluation of adhesion of a sample after the heat cycle test was conducted, and no infiltration of the dye penetrant inspection liquid into the thin film layer was observed.

According to Example 3, it was confirmed that a good adhesive effect is achieved by conducting insert molding by using the insert component, which was the brass plate on which the thin film layer made of the CSM rubber composition was formed, and the PPS resin which had been reinforced by addition of 40 parts by weight of GF.

Example 4

To 100 parts by weight of toluene, 40 parts by weight of the above-described CSM rubber composition was added to prepare an organic solution. The organic solution was applied to a brass plate C2801P, and the plate was dried to give an insert component on which a thin film layer in a non-crosslinked state was formed.

At this time, the average thickness of the thin film layer was 28 μm.

Insert molding was conducted by using the insert component and a PPS resin to which 65 parts by weight in total of GF and an inorganic reinforcing material had been added (DURAFIDE 6165A6: manufactured by Polyplastics Co., Ltd.). The insert molding was conducted after the insert component 3A, on which the thin film layer 4A had been formed by natural drying under an environment of room temperature (25° C.) for 16 hours, was further kept as it was at room temperature for 1 day.

According to the evaluation of adhesion of the obtained insert molded article, no infiltration of the dye penetrant inspection liquid into the thin film layer was observed.

In addition, the evaluation of adhesion of a sample after the heat cycle test was conducted, and no infiltration of the dye penetrant inspection liquid into the thin film layer was observed.

According to Example 4, it was confirmed that a good adhesive effect is achieved by conducting insert molding by using the insert component, which was the brass plate on which the thin film layer made of the CSM rubber composition was formed, and the PPS resin which had been reinforced by addition of 65 parts by weight of GF and the inorganic reinforcing material.

Example 5

To 100 parts by weight of toluene, 15 parts by weight of the above-described CSM rubber composition was added to prepare an organic solution. The organic solution was applied to a brass plate C2801P, and the plate was dried to give an insert component on which a thin film layer in a non-crosslinked state was formed.

At this time, the average thickness of the thin film layer was 13 μm.

Insert molding was conducted by using the insert component and a PPS resin to which 40 parts by weight of GF had been added (DURAFIDE 1140A1: manufactured by Polyplastics Co., Ltd.). The insert molding was conducted after the insert component 3A, on which the thin film layer 4A had been formed by natural drying under an environment of room temperature (25° C.) for 16 hours, was further kept as it was at room temperature for 1 day.

According to the evaluation of adhesion of the obtained insert molded article, no infiltration of the dye penetrant inspection liquid into the thin film layer was observed.

In addition, the evaluation of adhesion of the insert molded article after the heat cycle test was conducted, and it was found that there were portions of the thin film layer into which the dye penetrant inspection liquid infiltrated at about 3% of the total, but it was jugged that the adhesion had no problem in practical use.

According to Example 5, it was confirmed that a good adhesive effect was also achieved by conducting insert molding by using the insert component, which was the brass plate on which the thin film layer having a small thickness and is made of the CSM rubber composition was formed, and the PPS resin.

Example 6

To 100 parts by weight of toluene, 40 parts by weight of the above-described CSM rubber composition was added to prepare an organic solution. The organic solution was applied to a brass plate C2801P, and the plate was dried to give an insert component on which a thin film layer in a non-crosslinked state was formed.

At this time, the average thickness of the thin film layer was 55 μm.

Insert molding was conducted by using the insert component and a PPS resin to which 40 parts by weight of GF had been added (DURAFIDE 1140A1: manufactured by Polyplastics Co., Ltd.). The insert molding was conducted after the insert component 3A, on which the thin film layer 4A had been formed by natural drying under an environment of room temperature (25° C.) for 16 hours, was further kept as it was at room temperature for 1 day.

According to the evaluation of adhesion of the obtained insert molded article, no infiltration of the dye penetrant inspection liquid into the thin film layer was observed.

In addition, the evaluation of adhesion of a sample after the heat cycle test was conducted, and no infiltration of the dye penetrant inspection liquid into the thin film layer was observed.

According to Example 6, it was confirmed that a good adhesive effect was also achieved by conducting insert molding by using the insert component, which was the brass plate on which the thin film layer having a large thickness and is made of the CSM rubber composition was formed, and the PPS resin.

Example 7

To 100 parts by weight of toluene, 40 parts by weight of the above-described CSM rubber composition was added to prepare an organic solution. The organic solution was applied to a copper plate which has a name of tough pitch copper and a mark of C1100P prescribed in JIS H3100, and the plate was dried to give an insert component on which a thin film layer in a non-crosslinked state was formed.

At this time, the average thickness of the thin film layer was 31 μm.

Insert molding was conducted by using the insert component and a PPS resin to which 40 parts by weight of GF had been added (DURAFIDE 1140A1: manufactured by Polyplastics Co., Ltd.). The insert molding was conducted after the insert component 3A, on which the thin film layer 4A had been formed by natural drying under an environment of room temperature (25° C.) for 16 hours, was further kept as it was at room temperature for 1 day.

According to the evaluation of adhesion of the obtained insert molded article, no infiltration of the dye penetrant inspection liquid into the thin film layer was observed. In addition, the evaluation of adhesion of a sample after the heat cycle test was conducted, and no infiltration of the dye penetrant inspection liquid into the thin film layer was observed.

According to Example 7, it was confirmed that a good adhesive effect is achieved by conducting insert molding by using the insert component, which was the copper plate on which the thin film layer made of the CSM rubber composition was formed, and the PPS resin which had been reinforced by addition of 40 parts by weight of GF.

Example 8

To 100 parts by weight of toluene, 40 parts by weight of the above-described CSM rubber composition was added to prepare an organic solution. The organic solution was applied to a phosphor bronze plate which has a name of phosphor bronze and a mark of C5191P prescribed in JIS H3110, and the plate was dried to give an insert component on which a thin film layer in a non-crosslinked state was formed.

At this time, the average thickness of the thin film layer was 29 μm.

Insert molding was conducted by using the insert component and a PPS resin to which 40 parts by weight of GF had been added (DURAFIDE 1140A1: manufactured by Polyplastics Co., Ltd.). The insert molding was conducted after the insert component 3A, on which the thin film layer 4A had been formed by natural drying under an environment of room temperature (25° C.) for 16 hours, was further kept as it was at room temperature for 1 day.

According to the evaluation of adhesion of the obtained insert molded article, no infiltration of the dye penetrant inspection liquid into the thin film layer was observed.

In addition, the evaluation of adhesion of a sample after the heat cycle test was conducted, and no infiltration of the dye penetrant inspection liquid into the thin film layer was observed.

According to Example 8, it was confirmed that a good adhesive effect is achieved by conducting insert molding by using the insert component, which was the phosphor bronze plate on which the thin film layer made of the CSM rubber composition was formed, and the PPS resin which had been reinforced by addition of 40 parts by weight of GF.

Example 9

To 100 parts by weight of toluene, 40 parts by weight of the above-described CSM rubber composition was added to prepare an organic solution. The organic solution was applied to a brass plate C2801P and the plate was dried to give an insert component on which a thin film layer in a non-crosslinked state was formed.

At this time, the average thickness of the thin film layer was 35 μm.

The insert component was kept as it was in a thermohygrostat bath, in which the temperature was adjusted to 25° C. and the humidity was adjusted to 50%, for 13 days.

Insert molding was conducted by using the insert component and a PPS resin to which 40 parts by weight of GF had been added (DURAFIDE 1140A1: manufactured by Polyplastics Co., Ltd.).

According to the evaluation of adhesion of the obtained insert molded article, no infiltration of the dye penetrant inspection liquid into the thin film layer was observed.

In addition, the evaluation of adhesion of a sample after the heat cycle test was conducted, and no infiltration of the dye penetrant inspection liquid into the thin film layer was observed.

According to Example 9, it was confirmed that a good adhesive effect was also achieved by conducting insert molding by using the insert component on which the thin film layer had been formed and which had been stored for a long period of time under a room temperature environment.

Comparative Example 1

Insert molding was conducted by using a brass plate C2801P on which no thin film layer was formed as an insert component, and a PPS resin to which 40 parts by weight of GF had been added (DURAFIDE 1140A1: manufactured by Polyplastics Co., Ltd.).

The insert component peeled off from the resin at the same time with releasing the insert molded article from the cavity.

Accordingly, it was proved that the insert component did not adhere to the resin.

According to Comparative Example 1, it was confirmed that the desired adhesive effect between the metal and the resin cannot be achieved by using the insert component on which no thin film layer had been formed.

Comparative Example 2

To 100 parts by weight of toluene, 40 parts by weight of the above-described CSM rubber composition was added to prepare an organic solution. The organic solution was applied to a brass plate C2801P and the plate was dried to give an insert component on which a thin film layer in a non-crosslinked state was formed.

At this time, the average thickness of the thin film layer was 29 μm.

Crosslinking of the insert component was performed in a drying oven at 170° C. for 4 hours.

The insert component was immersed in toluene, and after the lapse of 1 hour, the application surface was observed. Then, it was confirmed that the thin film layer had been completely crosslinked because of the fact that the thin film layer did not peel off from the metal plate.

Insert molding was conducted by using the insert component and a PPS resin to which 40 parts by weight of GF had been added (DURAFIDE 1140A1: manufactured by Polyplastics Co., Ltd.). The insert molding was conducted after the insert component 3A, on which the thin film layer had been crosslinked, was further kept as it was at room temperature for 1 day.

The insert component peeled off from the resin at the same time with releasing the insert molded article from the cavity.

Accordingly, it was proved that the insert component did not adhere to the resin.

According to Comparative Example 2, it was confirmed that the desired adhesive effect between the metal and the resin cannot be achieved by conducting insert molding by using the insert component on which the thin film layer had been completely crosslinked.

The evaluation results of Examples 1 to 9 as well as Comparative Examples 1 and 2 are shown in Table 1. The evaluations of adhesion are shown based on the following criteria.

When no infiltration of the penetration liquid was found and the adhesion was good, the evaluation is expressed by "⊙." When a trace of the slight infiltration of the penetration liquid was found, but it can be judged that there are no problems in practical use, the evaluation is expressed by "o." When the infiltration was found on the whole surface and the adhesion was poor, the evaluation is expressed by "x." The matter for which evaluation was not conducted is expressed by "-."

| | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Resin | PPS | PPS | PPS | PPS | PPS | PPS | PPS | PPS | PPS | PPS | PPS |
| Reinforcing material [Parts by weight] | 0 | 30 | 40 | 65 | 40 | 40 | 40 | 40 | 40 | 40 | 40 |
| Average thin film layer [μm] | 34 | 30 | 35 | 28 | 13 | 55 | 31 | 29 | 35 | No thin file layer | 29 |
| Time period from formation of thin film layer to insert molding | 1 day | 1 day | 1 day | 1 day | 1 day | 1 day | 1 day | 1 day | 13 day | — | 1 day |
| State of crosslinking of thin film layer | Non-crosslinked | Non-crosslinked | Non-crosslinked | Non-crosslinked | Non-crosslinked | Non-crosslinked | Non-crosslinked | Non-crosslinked | Non-crosslinked | — | Completely crosslinked |
| Insert component | Brass | Brass | Brass | Brass | Brass | Brass | Copper | Phosphor bronze | Brass | Brass | Brass |
| Adhesive effect after molding | ⊙ | ⊙ | ⊙ | ⊙ | ⊙ | ⊙ | ⊙ | ⊙ | ⊙ | — | — |
| Adhesive effect after heat cycle | ○ | ⊙ | ⊙ | ⊙ | ○ | ⊙ | ⊙ | ⊙ | ⊙ | — | — |

From the above results of each of the examples and comparative examples, it was confirmed that an excellent effect of enhancing adhesion between an insert component and a thermoplastic resin is exhibited, when insert molding is conducted by using a thin film layer made of a non-crosslinked CSM rubber composition and a PPS resin as a resin for molding, because crosslinking of the thin film layer occurs in a mold by being heated during insert molding.

INDUSTRIAL APPLICABILITY

The insert molding method and the insert molded article according to the present invention are suitable for an electric part for use in an automobile.

REFERENCE SIGNS LIST

1: Insert molded article
2, 2A: Resin insulator
3: Metal conductor
3A: Insert component
4, 4A: Thin film layer
5: stationary side mold
6: movable side mold
7: Cavity

The invention claimed is:

1. An insert molding method, comprising:
setting an insert component, which is a metal conductor, in a mold;
clamping the mold; and
injection-filling a thermoplastic resin in a cavity of the mold, thereby integrally molding the thermoplastic resin with the component,
wherein the insert component is made of copper or a copper alloy, and
prior to injection molding, a thin film layer mainly made of a chlorosulfonated polyethylene is formed on a surface of a portion of the insert component to be covered with the thermoplastic resin, and the thin film layer is crosslinked in the mold during injection molding.

2. The insert molding method according to claim 1, wherein the thermoplastic resin is a polyphenylene sulfide resin.

3. An insert molded article formed from the thermoplastic resin integrally molded with the component by using the insert molding method according to claim 1,
wherein a portion of the metal conductor made of copper or the copper alloy is integrally connected with a resin insulator made of the thermoplastic resin through the thin film layer mainly made of the chlorosulfonated polyethylene.

4. An insert molded article formed from the thermoplastic resin integrally molded with the component by using the insert molding method according to claim 2,
wherein a portion of the metal conductor made of copper or the copper alloy is integrally connected with a resin insulator made of the thermoplastic resin through the thin film layer mainly made of the chlorosulfonated polyethylene.

* * * * *